US012810609B2

(12) United States Patent
Stoller

(10) Patent No.: US 12,810,609 B2
(45) Date of Patent: Nov. 24, 2026

(54) SYSTEMS AND METHODS FOR BIOMASS IDENTIFICATION

(71) Applicant: Precision Planting LLC, Tremont, IL (US)

(72) Inventor: Jason J Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 129 days.

(21) Appl. No.: 18/992,126

(22) PCT Filed: Jul. 4, 2023

(86) PCT No.: PCT/IB2023/056937
§ 371 (c)(1),
(2) Date: Jan. 7, 2025

(87) PCT Pub. No.: WO2024/038330
PCT Pub. Date: Feb. 22, 2024

(65) Prior Publication Data
US 2026/0011141 A1 Jan. 8, 2026

Related U.S. Application Data

(60) Provisional application No. 63/371,588, filed on Aug. 16, 2022.

(51) Int. Cl.
*G06K 9/00* (2022.01)
*G06V 10/143* (2022.01)
(Continued)

(52) U.S. Cl.
CPC .......... *G06V 20/188* (2022.01); *G06V 10/143* (2022.01); *G06V 10/764* (2022.01); *G06V 20/64* (2022.01)

(58) Field of Classification Search
USPC ....... 382/100, 103, 106, 108, 123, 154, 156, 382/162, 168, 181, 199, 254, 286, 305,
(Continued)

(56) References Cited

U.S. PATENT DOCUMENTS 12,165,388 B2 12/2024 Hoeferlin et al.
2009/0226036 A1 9/2009 Gaal
(Continued)

FOREIGN PATENT DOCUMENTS

WO 2022090852 A1 5/2022

OTHER PUBLICATIONS

Harvard John A. Paulson School of Engineering and Applied Sciences, "Portable polarization-sensitive camera could be used in machine vision, autonomous vehicles, security and more", Jul. 4, 2019, 6 pages.
(Continued)

*Primary Examiner* — Seyed H Azarian

(57) ABSTRACT

A computer implemented method for identifying biomass includes receiving an input to initiate a continuous process for identifying biomass including plants in the agricultural field, obtaining image data from one or more image sensors of an agricultural implement that is traversing rows of plants in the agricultural field, wherein each image sensor includes RGB filters and a plurality of polarization filters, analyzing a number of independent channels from the image data to determine a plurality of parameters of the biomass including the rows of plants, and classifying the biomass including the rows of plants based on the analysis for 3D reconstruction of the rows of plants.

10 Claims, 7 Drawing Sheets

(51) Int. Cl.
*G06V 10/764* (2022.01)
*G06V 20/10* (2022.01)
*G06V 20/64* (2022.01)

(58) Field of Classification Search
USPC .................................. 382/312; 345/144, 419
See application file for complete search history.

(56) References Cited

U.S. PATENT DOCUMENTS

2016/0006954 A1* 1/2016 Robertson .............. H04N 23/11
348/144
2017/0131718 A1* 5/2017 Matsumura .......... A01B 69/001
2017/0223947 A1 8/2017 Gall et al.
2019/0259108 A1* 8/2019 Bongartz ............. G06Q 10/063
2021/0118931 A1 4/2021 Matsunuma et al.
2021/0325868 A1 10/2021 Allgaier et al.
2021/0386051 A1* 12/2021 Seitz ................... A01M 7/0089
2022/0151216 A1 5/2022 Stuber et al.
2022/0254115 A1 8/2022 Ireland et al.
2022/0256832 A1 8/2022 Serrat et al.
2022/0366668 A1* 11/2022 Ito .......................... G01N 21/21
2023/0131770 A1 4/2023 Stoller et al.
2023/0316555 A1* 10/2023 Spangenberg ......... G06Q 10/06
345/419
2024/0161479 A1* 5/2024 Tyan ...................... G06V 10/42

OTHER PUBLICATIONS

"Color polarization camera introduced by LUCID Vision Labs", Vision Systems Design, Nov. 9, 2018, available at https://www.visionsystems.com/ cameras-accessories/article/167 51714/ color-polarizationcamera-introduced-by-lucid-vision-labs [retrieved on Jan. 3, 2023], 3 pages.
"Save Time and Effort with On-Sensor Polarization", Jan. 26, 2022, Teledyne Flir, available at https://www.flir.co.uk/discover/iis/machinevision/imaging-reflective-surfaces-sonys-first-polarized-sensor/[retrieved Jan. 3, 2023], 12 pages.
UK Intellectual Property Office, Search Report for related UK Application No. GB2212723.7, dated Mar. 3, 2023, 4 pages.
European Patent Office, Search Report for related PCT Application No. PCT/IB2023/056937, dated Sep. 15, 2023, 15 pages.

* cited by examiner

SYSTEMS AND METHODS FOR BIOMASS IDENTIFICATION

CROSS-REFERENCE TO RELATED APPLICATIONS

This application claims the benefit of International Patent Application PCT/IB2023/056937, "Systems and Methods for Biomass Identification" filed Jul. 4, 2023, which claims the benefit of U.S. Provisional Patent Application 63/371,588, "Systems and Methods for Biomass Identification," filed Aug. 16, 2022, the entire disclosure of each are incorporated herein by reference.

FIELD

Embodiments of the present disclosure relate generally to systems and methods for image sensor-based biomass identification.

BACKGROUND

Sprayers and other fluid application systems are used to apply fluids (such as fertilizer, herbicide, insecticide, and/or fungicide) to fields. Cameras on the sprayers capture images of the crops.

BRIEF DESCRIPTION OF THE DRAWINGS

The present disclosure is illustrated by way of example, and not by way of limitation, in the FIGS. of the accompanying drawings and in which.

BRIEF SUMMARY

Figure 1:
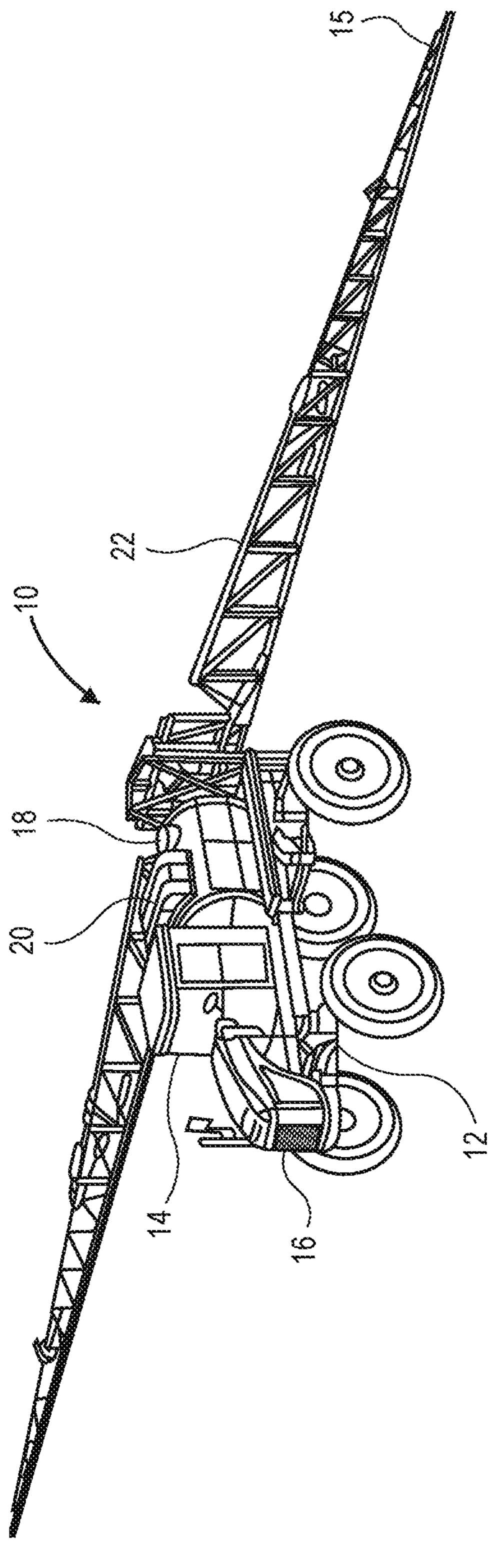
FIG. 1 illustrates an agricultural implement.

Described herein are systems and methods for vision-based plant detection utilizing at least one polarization filter and image sensors. In an aspect of the disclosure there is provided a computer implemented method for identifying biomass in an agricultural field that includes in response to an input to initiate a continuous process for identifying biomass in an agricultural field, obtaining image data from one or more image sensors of an agricultural implement that is traversing rows of plants in the agriculture field, wherein each image sensor includes RGB filters and a plurality of polarization filters, analyzing a number of independent channels from the image data to determine a plurality of parameters of the biomass including the rows of plants, and classifying the biomass including the rows of plants based on the analysis for 3D reconstruction of the rows of plants.

A further aspect of the disclosure includes four independent channels including red (R), green (G), blue (B) and near infrared (NIR).

A further aspect of the disclosure includes seven independent channels including each one of two polarization filters being combined with each of red (R), green (G) and blue (B) and a separate near infrared (NIR).

A further aspect of the disclosure includes eight independent channels including each one of two polarization filters being combined with each one of red (R), green (G), blue (B) and near infrared (NIR).

A further aspect of the disclosure includes thirteen independent channels including each one of four polarization filters being combined with each of red (R), green (G) and blue (B) and a separate near infrared (NIR).

A further aspect of the disclosure includes sixteen independent channels including each one of four polarization filters being combined with each one of red (R), green (G), blue (B) and near infrared (NIR).

In a further aspect of the disclosure, classifying the biomass including the rows of plants comprises determining a type of crop.

In a further aspect of the disclosure, the plurality of parameters of the biomass includes a growth stage of the plant.

In a further aspect of the disclosure, the plurality of parameters of the biomass includes at least one of a depth, a texture and a shape of the plant.

In a further aspect of the disclosure, the agricultural implement comprises one of a sprayer and a planter.

In a further aspect of the disclosure, the one or more image sensors are arranged along a boom of the agricultural implement.

In an aspect of the disclosure there is provided a system including a plurality of cameras disposed along an agricultural implement to capture a plurality of images of rows of plants as the implement traverses an agricultural field; and a processor that is configured to execute instruction to, in response to an input to initiate a continuous process for identifying biomass in an agricultural field, obtain image data from one or more image sensors of the camera, wherein each image sensor includes RGB filters and a plurality of polarization filters, analyze a number of independent channels from the image data to determine a plurality of parameters of the biomass including the rows of plants, and classify the biomass including the rows of plants based on the analysis for 3D reconstruction of the rows of plants.

In a further aspect of the disclosure, the camera includes a near infrared (NIR) filter, wherein a plurality of combinations of the RGB, NIR and polarization filters provide the number of independent channels.

In a further aspect of the disclosure, the number of independent channels is seven including each one of two polarization filters being combined with each of red (R), green (G) and blue (B) and a separate near infrared (NIR).

In a further aspect of the disclosure, the number of independent channels is eight including each one of two polarization filters being combined with each one of red (R), green (G), blue (B) and near infrared (NIR).

In a further aspect of the disclosure, the number of independent channels is thirteen including each one of four polarization filters being combined with each of red (R), green (G) and blue (B) and a separate near infrared (NIR).

In a further aspect of the disclosure, the number of independent channels is sixteen including each one of four polarization filters being combined with each one of red (R), green (G), blue (B) and near infrared (NIR).

In a further aspect of the disclosure, classifying the biomass including the rows of plants comprises determining a type of crop and the plurality of parameters of the biomass includes a growth stage, a depth, a texture and a shape of the plant.

In a further aspect of the disclosure, the agricultural implement comprises one of a sprayer and a planter.

In a further aspect of the disclosure, the one or more image sensors are arranged along a boom of the agricultural implement.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

DETAILED DESCRIPTION

All references cited herein are incorporated herein in their entireties. If there is a conflict between a definition herein and in an incorporated reference, the definition herein shall control.

This disclosure is related to systems and methods for three-dimensional (3D) reconstruction and analysis of an object.

An agricultural implement, such as sprayer 10 is illustrated in FIG. 1. While the system 15 can be used on a sprayer, the system 15 can be used on any agricultural implement that is used to apply fluid to soil, such as a side-dress bar, a planter, a seeder, an irrigator, a center pivot irrigator, a tillage implement, a tractor, a cart, or a robot. System 15 can also be used as monitoring mechanism for capturing images of crops, weeds and soil using cameras attached to agriculture implement 10. A reference to boom or boom arm herein includes corresponding structures, such as a toolbar, in other agricultural implements.

The agricultural crop sprayer 10 of FIG. 1 is used to deliver chemicals to agricultural crops in a field. Agricultural sprayer 10 comprises a chassis 12 and a cab 14 mounted on the chassis 12. Cab 14 may house an operator and a number of controls for the agricultural sprayer 10. An engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides energy to propel the agricultural sprayer 10 and also can be used to provide energy used to spray fluids from the sprayer 10.

Although a self-propelled application machine is shown and described hereinafter, it should be understood that the embodied invention is applicable to other agricultural sprayers including pull-type or towed sprayers and mounted sprayers, e.g., mounted on a 3-point linkage of an agricultural tractor.

The sprayer 10 further comprises a fluid storage tank 18 used to store a spray fluid to be sprayed on the field. The spray fluid can include chemicals, such as but not limited to, herbicides, pesticides, and/or fertilizers. The fluid can be a substance such as a liquid or gas that is capable of flowing and changing its shape when acted upon by a force. Fluid storage tank 18 is to be mounted on chassis 12, either in front of or behind cab 14. The crop sprayer 10 can include more than one storage tank 18 to store different chemicals to be sprayed on the field. The stored chemicals may be dispersed by the sprayer 10 one at a time or different chemicals may be mixed and dispersed together in a variety of mixtures. The sprayer 10 further comprises a rinse water tank 20 used to store clean water, which can be used for storing a volume of clean water for use to rinse the plumbing and main tank 18 after a spraying operation.

Figure 2:
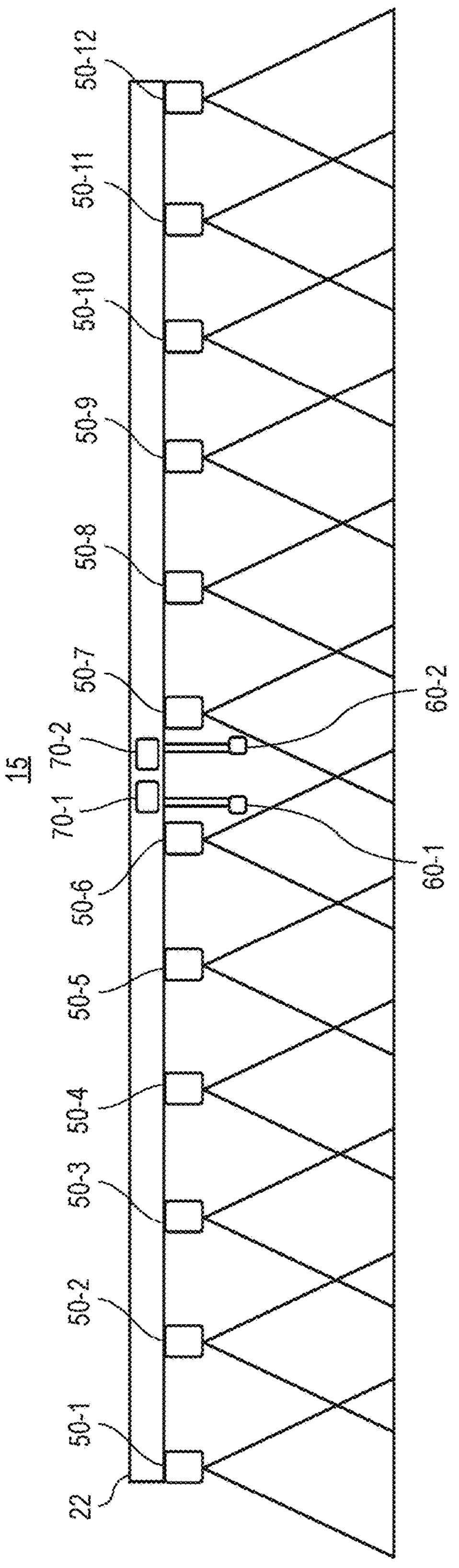
FIG. 2 illustrates cameras and lights mounted on a boom arm of an agriculture implements in accordance with one embodiment.
Figure 3:
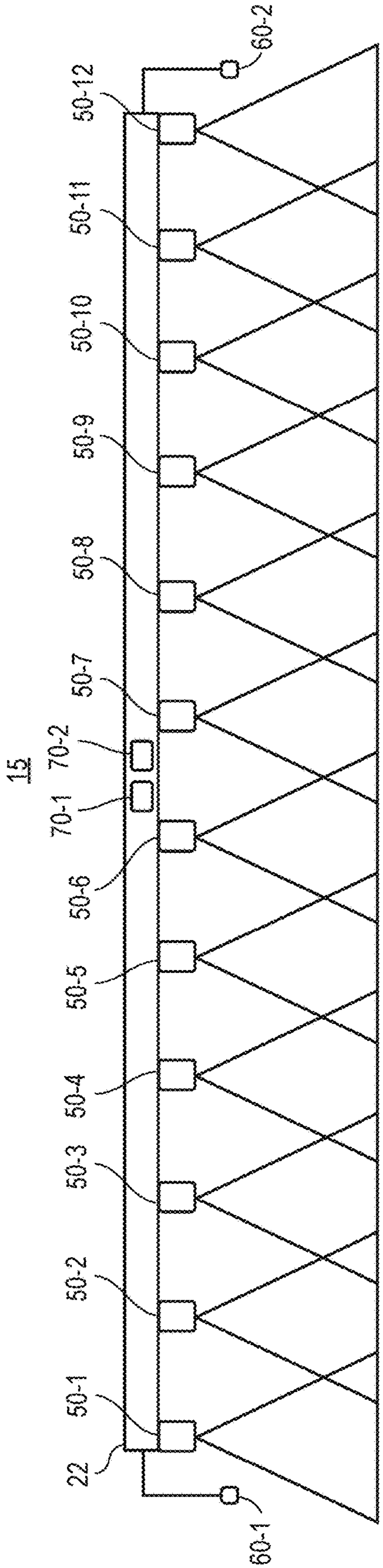
FIG. 3 illustrates cameras and lights mounted on a boom arm of an agriculture implement in accordance with another embodiment.

At least one boom arm 22 on the sprayer 10 is used to distribute the fluid from the fluid tank 18 over a wide swath as the sprayer 10 is driven through the field. The boom arm 22 is provided as part of a fluid application system 15 as illustrated in FIGS. 1 to 3, which further comprises an array of spray nozzles as well as lights, cameras, and processors arranged along the length of the boom arm 22 and suitable sprayer plumbing used to connect the fluid storage tank 18 with the spray nozzles. The sprayer plumbing will be understood to comprise any suitable tubing or piping arranged for fluid communication on the sprayer 10. Boom arm 22 can be in sections to permit folding of the boom arm for transport.

Additional components that can be included, such as control modules or lights, are disclosed in PCT Publication No. WO2020/178663 and U.S. Application No. 63/050,314, filed 10 Jul. 2020, respectively.

As illustrated in FIGS. 2 and 3, cameras such as two cameras 70 (70-1 and 70-2) can be disposed on the boom arm 22 with each camera 70-1 and 70-2 disposed to view half of the boom arm 22. The cameras can be used to capture images of surface as the agriculture implement (i.e. sprayer) traverses over the surface.

FIG. 2 illustrates two lights 60 (60-1, 60-2) that are disposed at a middle (24) of the boom arm 22 and disposed to each illuminate towards ends (23, 25) of boom arm 22.

FIG. 3 illustrates two lights 60 (60-1, 60-2) that are disposed at the ends (23, 25) of boom arm 22 and disposed to illuminate towards the middle (24) of boom arm 22. In one embodiment, valve and nozzle assemblies 50, lights 60, and cameras 70 are connected to a network. An example of a network is described in PCT Publication No. WO2020/039295A1.

An image sensor incorporating RGB color filters have been used for crop/weed detection. A Bayer matrix filter is one such filter. In some applications, an additional sensor such as a near infra red (NIR) sensor may be utilized. RGB filter may be combined (or, modified) with a near infra red (NIR) sensor to improve the image accuracy. An additional sensor, such as a NIR sensor, provides the desired higher signal-to-noise ratio (SNR) based on chlorophyll in vegetation.

The combined RGB/NIR image sensor produces four (4) four colors per pixel (4 independent channels):

| R | G | B | NIR |
|---|---|---|---|

Example embodiments obtain greater accuracy in object reconstruction by utilizing polarization filter(s) in the image sensor.

Polarization is the direction in which light vibrates and is invisible to the human eye. Polarization provides information about objects with which the light interacts. Cameras using polarization can detect material stress, enhance contrast for object detection and analyze surface quality for dents and scratches. Polarized light changes upon reflection off of a surface. Such a change can be used to estimate the depth, texture and shape of the object that is being reconstructed. It can also be used to distinguish man-made objects from natural ones even if they are the same shape and color. In the context of plants and weeds, the depth, texture and shape of the plants can be determined using polarization.

Figure 4:
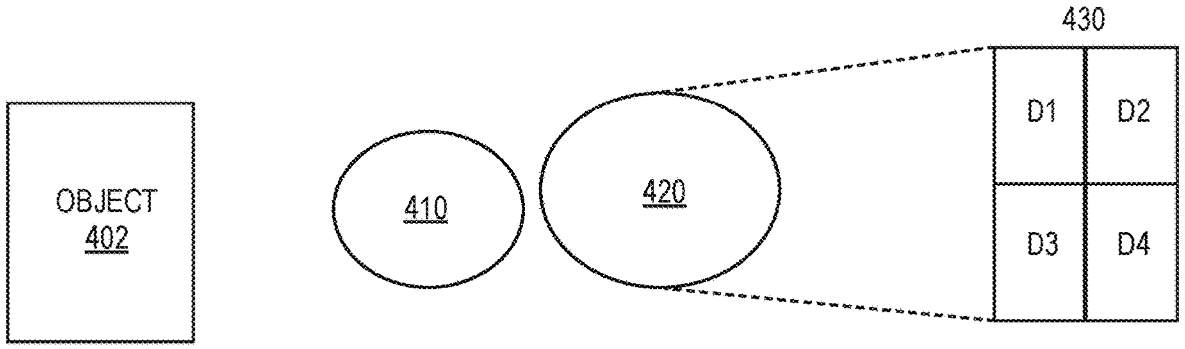
FIG. 4 illustrates a polarization camera for directing light based on its polarization in accordance with one embodiment.

In one example, a miniature polarization camera having dimensions of a few centimeters uses a metasurface polarization grating 410 (or polarization filter) with an array of subwavelength spaced nanopillars to receive light reflected from an object 402 (e.g., crop, weed, insect, disease) and direct light to an imaging lens 420 based on its polarization. If four directions are used by the camera, as illustrated in FIG. 4, the light forms four images (D1, D2, D3 and D4) on four quadrants of an image sensor 430. Each of the images corresponds to a different aspect of the polarization. The multiple images (4 in this case), taken together, provide a full snapshot of polarization at every pixel.

The number of filters may be divided equally between a horizontal plane and a vertical plane. That is, if four filters are used, the filters may view the object at 45° intervals. If two filters are used, they may view the object at 90° intervals.

Various combinations of the number of polarization filters in combination with RGB and NIR filters provide various number of independent channels. An image from a standard digital camera will have a red, green, and blue channel. Color digital images are made of pixels and pixels are made of combinations of primary colors represented by a series of code. A channel is a grayscale image of a color image. The grayscale image is made of only one of the primary colors.

The combination of each of the RGB filters with four (4) polarization filters (1, 2, 3 and 4) and a separate NIR filter provides thirteen (13) channels highlighted below. Each polarization filter can correspond to a polarization direction.

| | 1 | 2 | 3 | 4 |
|---|---|---|---|---|
| R | R1 | R2 | R3 | R4 |
| G | G1 | G2 | G3 | G4 |
| B | B1 | B2 | B3 | B4 |
| NIR | NIR | | | |

The combination of each of the RGB filters and the NIR filter with 4 polarization filters 1, 2, 3 and 4 provides sixteen (16) channels:

| | 1 | 2 | 3 | 4 |
|---|---|---|---|---|
| R | R1 | R2 | R3 | R4 |
| G | G1 | G2 | G3 | G4 |
| B | B1 | B2 | B3 | B4 |
| NIR | NIR1 | NIR2 | NIR3 | NIR4 |

The combination of each of the RGB filters with two (2) polarization filters (1 and 2) and a separate NIR filter provides seven (7) channels:

-continued

| | 1 | 2 |
|---|---|---|
| R | R1 | R2 |
| G | G1 | G2 |
| B | B1 | B2 |
| NIR | NIR | |

The combination of each of the RGB filters and the NIR filter with 2 polarization filters 1 and 2 provides 8 channels:

| | 1 | 2 |
|---|---|---|
| R | R1 | R2 |
| G | G1 | G2 |
| B | B1 | B2 |
| NIR | NIR1 | NIR2 |

Each of these variation arrangements can be associated with a particular cost and benefit. A cost benefit analysis can be performed to determine an optimal arrangement for a particular application.

Figure 5B:
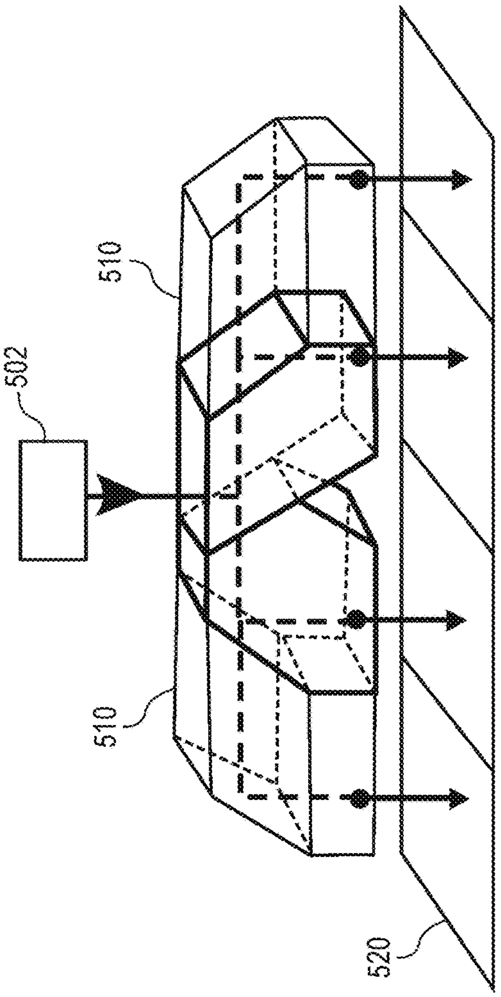
FIGS. 5A and 5B illustrates a prism combination directing light onto an image sensor via a polarization filter in accordance with one embodiment.
Figure 5A:
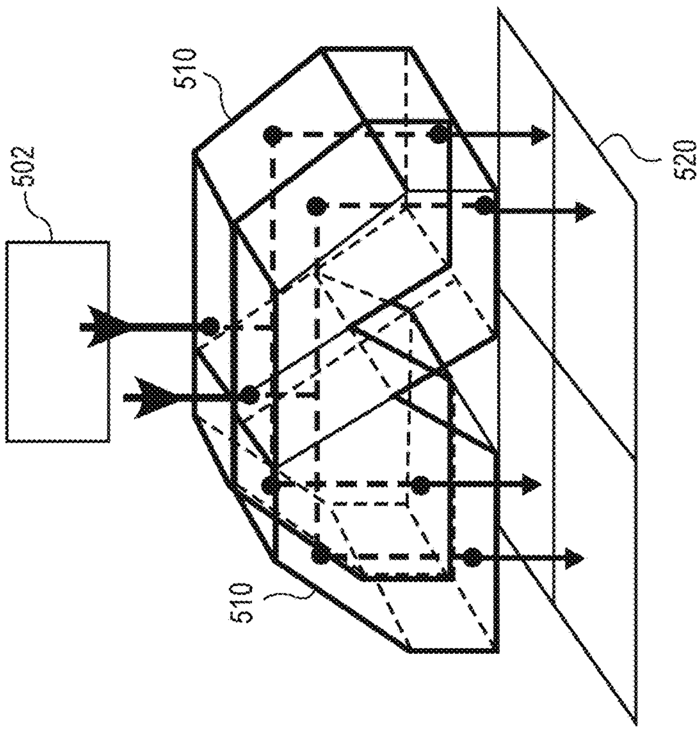

In some embodiments, a prism such as the beamsplitter prism combination 510 (of FIGS. 5A and 5B) can be utilized (instead of the metasurface polarization grating 410 of FIG. 4) to direct light from an object 502 onto an image sensor 520.

Two beam splitter prisms (upstream of polarization filters and RGB or NIR filters) can be used to split a single image into two (×2). That is, in order to obtain four (4) polarized replicated images that are filtered for RGB wavelength, light would pass through the beam splitter prisms combination of FIG. 5A, the polarization filters, lens and the image sensor as four replicated filter images. There could also be a second set of optics and image sensor in which a beam splitter splits into four images using the beam splitter combination of FIG. 5B The reconstruction of objects utilizing example embodiments can distinguish between crops, weeds, insects, soil and rocks. Weed detection can be used to target spraying of crops. The reconstruction can be utilized to distinguish the types of crops, insects and weeds. The type of crops can include, but not limited to, corn, soy beans, etc. It can also determine condition of crops or weeds such as the health and growth stage (e.g., VE stage for when corn seedling emerge from the soil and no leaf collars have formed, V1 stage when the plant has one visible leaf collar, V2, V3, V4, etc.). Spacing between plants can also be determined.

Figure 6:
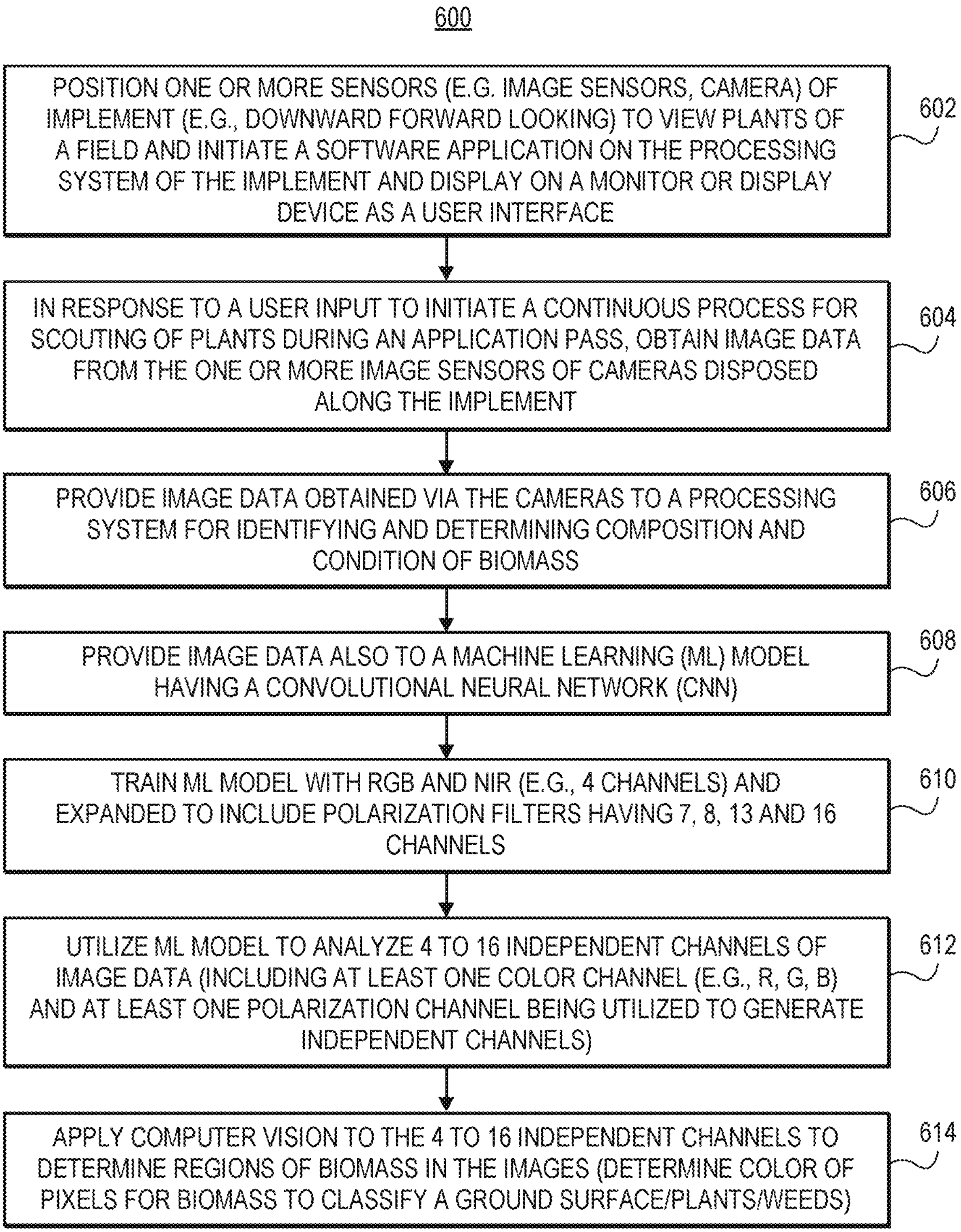
FIG. 6 illustrates a flow diagram of one embodiment for a computer implemented method.

FIG. 6 illustrates a flow diagram of one embodiment for computer implemented method 600 of a continuous scouting process that uses a machine learning model and computer vision bio-detection to detect and plot plants in a three dimensional space for an enhanced crop scouting tool. The method 600 is performed by processing logic that may comprise hardware (circuitry, dedicated logic, etc.), software (such as is run on a general purpose computer system or a dedicated machine or a device), or a combination of both. In one embodiment, the method 600 is performed by processing logic of a processing system of a system, machine, apparatus, implement, agricultural vehicle, aerial device, monitor, display device, user edge device, self-guided device, or self-propelled device (e.g., robot, drone, ATV, UTV, etc.). The processing system executes instructions of a software application or program with processing logic. The software application or program can be initiated by the processing system. In one example, a monitor or display device receives user input and provides a customized display for operations of the method 600.

At operation 602 of method 600 of FIG. 6, one or more sensors (e.g., image sensors, camera) of an agricultural implement are positioned (e.g., downward forward looking) to view plants of a field and a software application is initiated on the processing system of the implement and displayed on a monitor or display device as a user interface. The processing system may be integrated with or coupled to the agricultural implement that performs an application pass (e.g., planting, tillage, fertilization, spraying, etc.). Alternatively, the processing system may be integrated with an apparatus (e.g., drone, edge device with image capture device) associated with the machine that captures images before, during, or after the application pass. In one example, the user interface displays a live view of plants of a field.

At operation 604, in response to a user input to initiate a continuous process for scouting of plants during an application pass, image data is obtained from the one or more image sensors of cameras that are disposed along the implement. This process can detect linear rows of biomass and upon having several iterations of the row tracking process complete, a plant tracking process is initiated and receives input from the row tracking process. The sensors may be in-situ sensors positioned on each row unit of an implement, spaced across several row units, or positioned on a machine.

In an example embodiment, at operation 606, image data obtained via the cameras may be provided to a processing system for identifying and determining composition and condition of the biomass including rows of plants. At operation 608, the image data can also be provided to a machine learning (ML) model having a convolutional neural network (CNN). At operation 610, the ML model can be trained with RGB and NIR (i.e. 4 channels) and then expanded to include the polarization filters having the 7, 8, 13 and 16 channel scenarios.

At operation 612, the computer-implemented method utilizes the ML model to analyze 4 to 16 independent channels of image data. At least one color channel (e.g., R, G, B) and at least one polarization channel are utilized for generating the independent channels.

At operation 614, computer vision is applied to the 4 to 16 independent channels to determine regions of biomass in the one or more images. The computer vision can determine colors of pixels for the biomass to classify a ground surface, plants aligned in rows, and weeds. The polarization and additional channels generated with the polarization filters improves an accuracy of object (e.g., plants, weeds, insect, disease, etc.) detection for the ML model.

Figure 7:
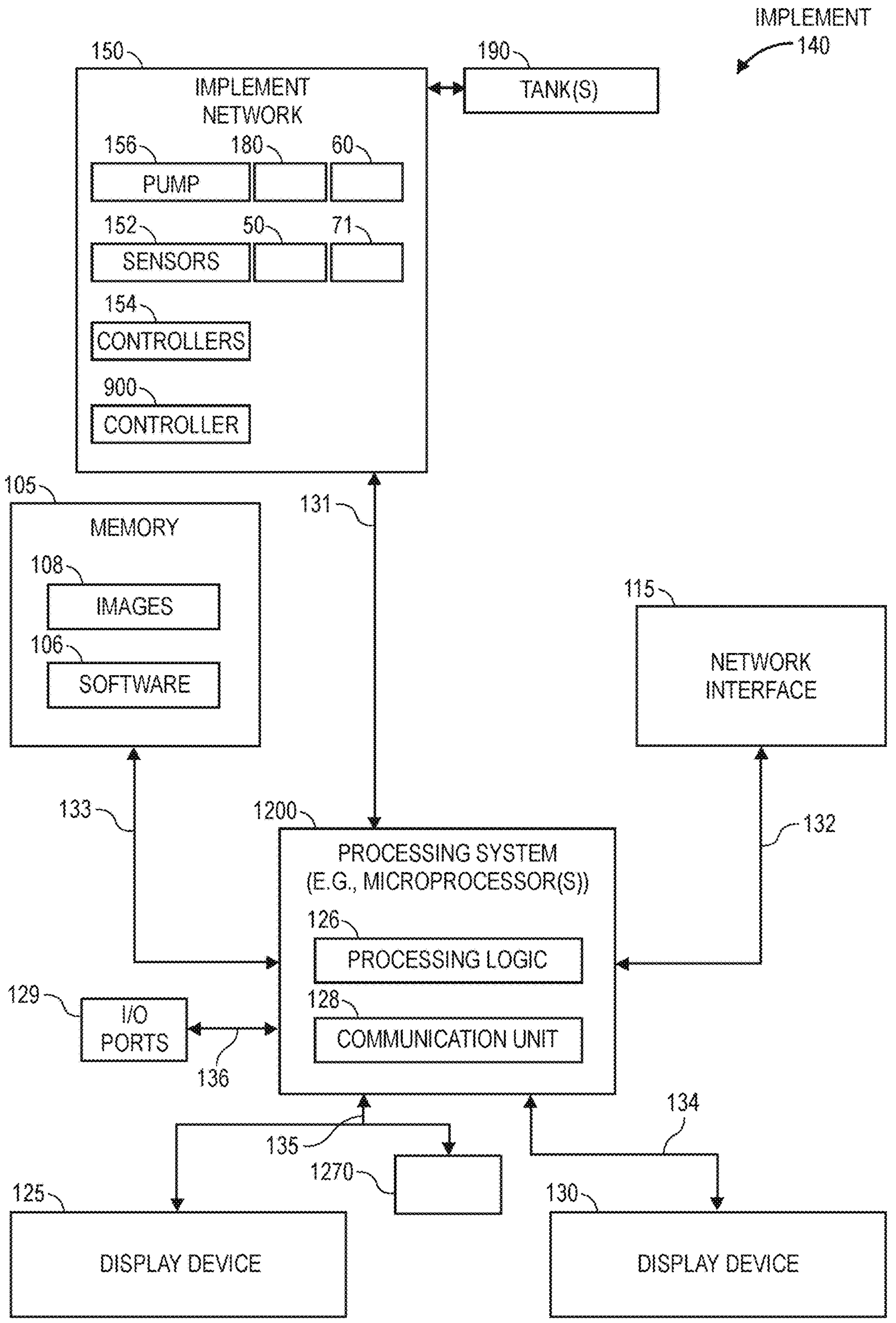
FIG. 7 shows an example of a block diagram of an implement 140 in accordance with one embodiment.

FIG. 7 shows an example of a block diagram of an implement 140 (e.g., sprayer, spreader, irrigation implement, etc.) in accordance with one embodiment. The implement 140 includes a processing system 1200, memory 105, and a network interface 115 for communicating with other systems or devices. The network interface 115 can include at least one of a GPS transceiver, a WLAN transceiver (e.g., WiFi), an infrared transceiver, a Bluetooth transceiver, Ethernet, or other interfaces from communications with other devices and systems. The network interface 115 may be integrated with an implement network 150 or separate from the implement network 150. The I/O ports 129 (e.g., a diagnostic/on board diagnostic (OBD) port) enable communication with another data processing system or device (e.g., display devices, sensors, etc.).

In one example, the implement 140 is a self-propelled implement that performs operations for fluid applications of a field. Data associated with the fluid applications can be displayed on at least one of the display devices 125 and 130.

The processing system 1200 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the network interface 115 or implement network 150. The communication unit 128 may be integrated with the processing system or separate from the processing system.

Processing logic 126 including one or more processors may process the communications received from the communication unit 128 including agricultural data (e.g., planting data, GPS data, fluid application data, flow rates, etc.). The system 1200 includes memory 105 for storing data and programs for execution (software 106) by the processing system. The memory 105 can store, for example, software components such as fluid application software for analysis of fluid applications for performing operations of the present disclosure, or any other software application or module, images 108 (e.g., captured images of crops, images of a spray pattern for rows of crops), alerts, maps, etc. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1200 communicates bi-directionally with memory 105, implement network 150, network interface 115, display device 125, display device 130, and I/O ports 129 via communication links 131-136, respectively.

Display devices 125 and 130 can provide visual user interfaces for a user or operator. The display devices may include display controllers. In one embodiment, the display device 125 is a portable tablet device or computing device with a touchscreen that displays data (e.g., nozzle condition data, planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 130 may be a display (e.g., display provided by an original equipment manufacturer (OEM)) that displays images and data for a localized view map layer, as-applied liquid or fluid application data, as-planted or as-harvested data, yield data, controlling an implement (e.g., planter, tractor, combine, sprayer, etc.), steering the implement, and monitoring the implement (e.g., planter, combine, sprayer, etc.). A cab control module 1270 may include an additional control module for enabling or disabling certain components or devices of the implement.

The implement 140 (e.g., planter, cultivator, plough, sprayer, spreader, irrigation, implement, etc.) includes an implement network 150 having multiple networks. The implement network 150 having multiple networks (e.g., Ethernet network, Power over Ethernet (POE) network, a controller area network (CAN) serial bus protocol network, an ISOBUS network, etc.) may include a pump 156 for pumping liquid or fluid from a storage tank(s) 190 to row units of the implement, communication module 180 for receiving communications from controllers and sensors and transmitting these communications. In one example, the implement network 150 includes nozzles 50, lights 60, and vision guidance system 71 having cameras and processors for various embodiments of the present disclosure.

Sensors 152 (e.g., speed sensors, seed sensors for detecting passage of seed, downforce sensors, actuator valves, OEM sensors, flow sensors, etc.), controllers 154 (e.g., drive system, GPS receiver), and the processing system 120 control and monitoring operations of the implement.

The OEM sensors may be moisture sensors or flow sensors, speed sensors for the implement, fluid application sensors for a sprayer, or vacuum, lift, lower sensors for an implement. For example, the controllers may include processors in communication with a plurality of sensors. The processors are configured to process data (e.g., fluid application data) and transmit processed data to the processing system 1200. The controllers and sensors may be used for monitoring motors and drives on the implement.

Figure 8:
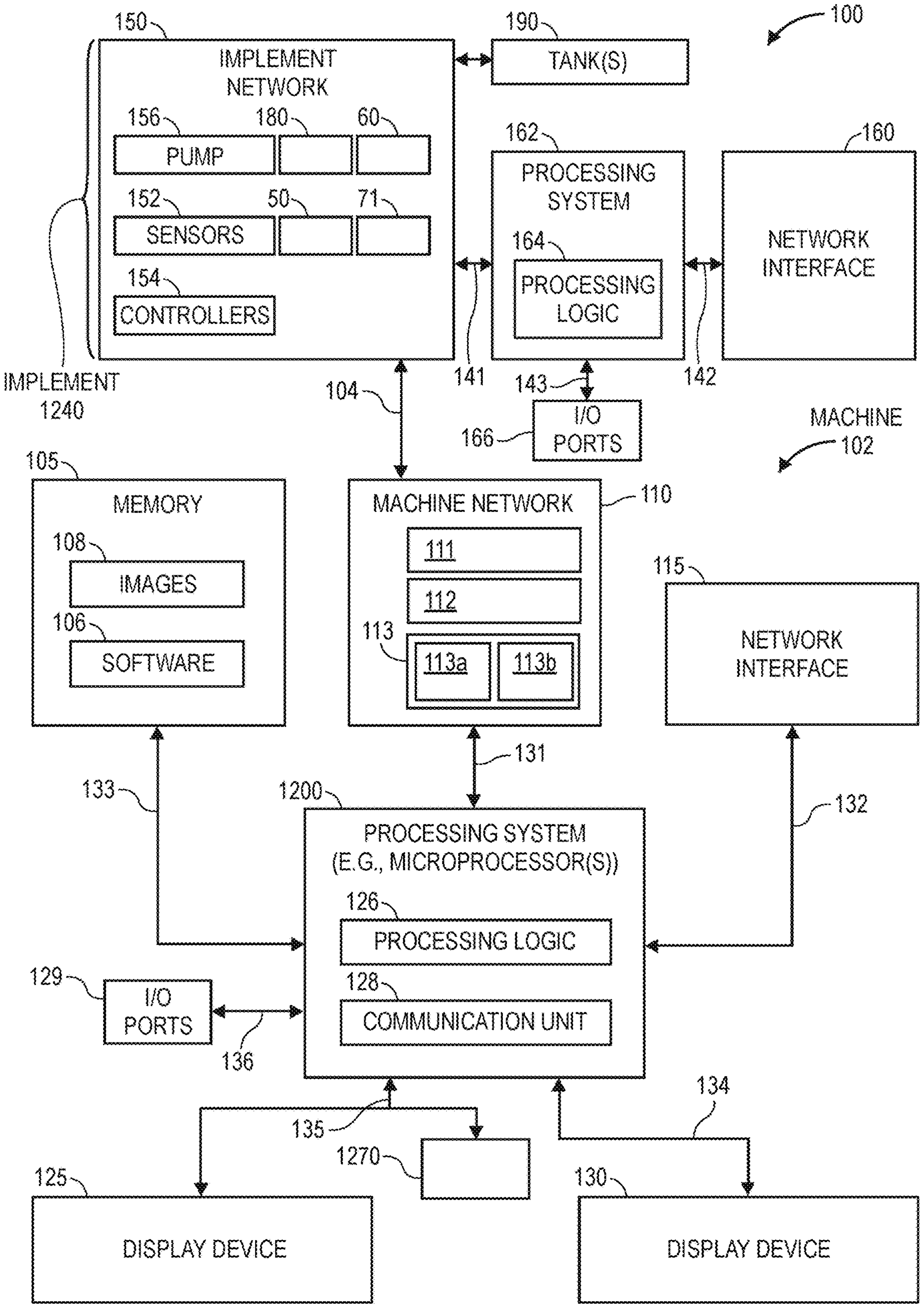
FIG. 8 shows an example of a block diagram of a system that includes a machine and an implement in accordance with one embodiment.

FIG. 8 shows an example of a block diagram of a system 100 that includes a machine 102 (e.g., tractor, combine harvester, etc.) and an implement 1240 (e.g., planter, cultivator, plough, sprayer, spreader, irrigation implement, etc.) in accordance with one embodiment. The machine 102 includes a processing system 1200, memory 105, machine network 110 that includes multiple networks (e.g., an Ethernet network, a network with a switched power line coupled with a communications channel (e.g., Power over Ethernet (POE) network), a controller area network (CAN) serial bus protocol network, an ISOBUS network, etc.), and a network interface 115 for communicating with other systems or devices including the implement 1240. The machine network 110 includes sensors 112 (e.g., speed sensors), controllers 111 (e.g., GPS receiver, radar unit) for controlling and monitoring operations of the machine or implement. The network interface 115 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 115 may be integrated with the machine network 110 or separate from the machine network 110. The I/O ports 129 (e.g., diagnostic/on board diagnostic (OBD) port) enable communication with another data processing system or device (e.g., display devices, sensors, etc.).

In one example, the machine is a self-propelled machine that performs operations of a tractor that is coupled to and tows an implement for planting or fluid applications of a field. Data associated with the planting or fluid applications can be displayed on at least one of the display devices 125 and 130.

The processing system 1200 may include one or more microprocessors, processors, a system on a chip (integrated circuit), or one or more microcontrollers. The processing system includes processing logic 126 for executing software instructions of one or more programs and a communication unit 128 (e.g., transmitter, transceiver) for transmitting and receiving communications from the machine via machine network 110 or network interface 115 or implement via implement network 150 or network interface 160. The communication unit 128 may be integrated with the processing system or separate from the processing system. In one embodiment, the communication unit 128 is in data communication with the machine network 110 and implement network 150 via a diagnostic/OBD port of the I/O ports 129 or via network devices 113*a* and 113*b*. A communication module 113 includes network devices 113*a* and 113*b*. The communication module 113 may be integrated with the communication unit 128 or it can be a separate component.

Processing logic 126 including one or more processors may process the communications received from the communication unit 128 including agricultural data (e.g., planting data, GPS data, liquid application data, flow rates, etc.). The system 1200 includes memory 105 for storing data and programs for execution (software 106) by the processing system. The memory 105 can store, for example, software components such as planting application software for analysis of planting applications for performing operations of the present disclosure, or any other software application or module, images 108 (e.g., captured images of crops), alerts, maps, etc. The memory 105 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1200 communicates bi-directionally with memory 105, machine network 110, network interface 115, display device 125, display device 130, and I/O ports 129 via communication links 130-136, respectively.

Display devices 125 and 130 can provide visual user interfaces for a user or operator. The display devices may include display controllers. In one embodiment, the display device 125 is a portable tablet device or computing device with a touchscreen that displays data (e.g., planting application data, liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 130 may be a display (e.g., display provided by an original equipment manufacturer (OEM)) that displays images and data for a localized view map layer, as-applied liquid or fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation, implement, etc.) includes an implement network 150 having multiple networks, a processing system 162 having processing logic 164, a network interface 160, and optional input/output ports 166 for communicating with other systems or devices including the machine 102. The implement network 150 having multiple networks (e.g., Ethernet network, Power over Ethernet (PoE) network, a controller area network (CAN) serial bus protocol network, an ISOBUS network, etc.) may include a pump 156 for pumping liquid or fluid from a storage tank(s) 190 to row units of the implement, communication modules (e.g., 180, 181) for receiving communications from controllers and sensors and transmitting these communications to the machine network. In one example, the communication modules include first and second network devices with network ports. A first network device with a port (e.g., CAN port) of communication module (CM) 180 receives a communication with data from controllers and sensors, this communication is translated or converted from a first protocol into a second protocol for a second network device (e.g., network device with a switched power line coupled with a communications channel, Ethernet), and the second protocol with data is transmitted from a second network port (e.g., Ethernet port) of CM 180 to a second network port of a second network device **113*b* of the machine network 110. A first network device 113*a* having first network ports (e.g., 1-4 CAN ports) transmits and receives communications from first network ports of the implement. In one example, the implement network 150 includes nozzles 50, lights 60, vision guidance system 71 having cameras and processors, and autosteer controller 900 for various embodiments of the present disclosure. The autosteer controller 900 may also be part of the machine network 110 instead of being located on the implement network 150 or in addition to being located on the implement network 150**.

Sensors 152 (e.g., speed sensors, seed sensors for detecting passage of seed, downforce sensors, actuator valves, OEM sensors, flow sensors, etc.), controllers 154 (e.g., drive system for seed meter, GPS receiver), and the processing system 162 control and monitoring operations of the implement.

The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process data (e.g., liquid application data, seed sensor data) and transmit processed data to the processing system 162 or 1200. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 160 can be a GPS transceiver, a WLAN transceiver (e.g., WiFi), an infrared transceiver, a Bluetooth transceiver, Ethernet, or other interfaces from communications with other devices and systems including the machine 102. The network interface 160 may be integrated with the implement network 150 or separate from the implement network 150 as illustrated in FIG. 8.

The processing system 162 communicates bi-directionally with the implement network 150, network interface 160, and I/O ports 166 via communication links 141-143, respectively. The implement communicates with the machine via wired and possibly also wireless bi-directional communications 104. The implement network 150 may communicate directly with the machine network 110 or via the network interfaces 115 and 160. The implement may also be physically coupled to the machine for agricultural operations (e.g., planting, harvesting, spraying, etc.). The memory 105 may be a machine-accessible non-transitory medium on which is stored one or more sets of instructions (e.g., software 106) embodying any one or more of the methodologies or functions described herein. The software 106 may also reside, completely or at least partially, within the memory 105 and/or within the processing system 1200 during execution thereof by the system 100, the memory and the processing system also constituting machine-accessible storage media. The software 106 may further be transmitted or received over a network via the network interface 115.

EXAMPLES

The following are non-limiting examples.

Example 1—a computer implemented method for identifying biomass in an agricultural field that includes in response to an input to initiate a continuous process for identifying biomass in an agricultural field, obtaining image data from one or more image sensors of an agricultural implement that is traversing rows of plants in the agriculture field, wherein each image sensor includes RGB filters and a plurality of polarization filters, analyzing a number of independent channels from the image data of the RGB filters and the plurality of polarization filters to determine a plurality of parameters of the biomass including the rows of plants, and classifying the biomass including the rows of plants based on the analysis for 3D reconstruction of the rows of plants.

Example 2—the computer implemented method of Example 1, wherein the number of independent channels includes four independent channels including red (R), green (G), blue (B) and near infrared (NIR).

Example 3—the computer implemented method of Example 1, wherein the number of independent channels includes seven independent channels including each one of two polarization filters being combined with each of red (R), green (G) and blue (B) and a separate near infrared (NIR).

Example 4—the computer implemented method of Example 1, wherein the number of independent channels includes eight independent channels including each one of two polarization filters being combined with each one of red (R), green (G), blue (B) and near infrared (NIR).

Example 5—the computer implemented method of Example 1, wherein the number of independent channels includes thirteen independent channels including each one of four polarization filters being combined with each of red (R), green (G) and blue (B) and a separate near infrared (NIR).

Example 6—the computer implemented method of Example 1, wherein the number of independent channels includes sixteen independent channels including each one of four polarization filters being combined with each one of red (R), green (G), blue (B) and near infrared (NIR).

Example 7—the computer implemented method of Example 1, wherein classifying the biomass including the rows of plants comprises determining a type of crop.

Example 8—the computer implemented method of any preceding Example, wherein the plurality of parameters of the biomass includes a growth stage of the plant.

Example 9—the computer implemented method of any preceding Example, wherein, the plurality of parameters of the biomass includes at least one of a depth, a texture and a shape of the plant.

Example 10—the computer implemented method of any preceding Example, wherein the agricultural implement comprises one of a sprayer and a planter.

Example 11—the computer implemented method of any preceding Example, wherein the one or more image sensors are arranged along a boom of the agricultural implement.

Example 12—a system including a plurality of cameras disposed along an agricultural implement to capture a plurality of images of rows of plants as the agricultural implement traverses an agricultural field; and a processor that is configured to execute instruction to, in response to an input to initiate a continuous process for identifying biomass in an agricultural field, obtain image data from one or more image sensors of the camera, wherein each image sensor includes RGB filters and a plurality of polarization filters, analyze a number of independent channels from the image data to determine a plurality of parameters of the biomass including the rows of plants, and classify the biomass including the rows of plants based on the analysis for 3D reconstruction of the rows of plants.

Example 13—the system of Example 12, wherein the camera includes a near infrared (NIR) filter, wherein a plurality of combinations of the RGB, NIR and polarization filters provide the number of independent channels.

Example 14—the system of Example 12, the number of independent channels is seven including each one of two polarization filters being combined with each of red (R), green (G) and blue (B) and a separate near infrared (NIR).

Example 15—the system of Example 12, the number of independent channels is eight including each one of two polarization filters being combined with each one of red (R), green (G), blue (B) and near infrared (NIR).

Example 16—the system of Example 12, the number of independent channels is thirteen including each one of four polarization filters being combined with each of red (R), green (G) and blue (B) and a separate near infrared (NIR).

Example 17—the system of Example 12, the number of independent channels is sixteen including each one of four polarization filters being combined with each one of red (R), green (G), blue (B) and near infrared (NIR).

Example 18—the system of Example 12, wherein classifying the biomass including the rows of plants comprises determining a type of crop and the plurality of parameters of the biomass includes a growth stage, a depth, a texture and a shape of the plant.

Example 19—the system of any of Examples 12-18, wherein the agricultural implement comprises one of a sprayer and a planter.

Example 20—the system of any of Examples 12-18, wherein the one or more image sensors are arranged along a boom of the agricultural implement.

The foregoing description is presented to enable one of ordinary skill in the art to make and use embodiments of the invention and is provided in the context of a patent application and its requirements. Various modifications to the preferred embodiment of the apparatus, and the general principles and features of the system and methods described herein will be readily apparent to those of skill in the art. Thus, the present disclosure is not to be limited to the embodiments of the apparatus, system and methods described above and illustrated in the drawing figures, but is to be accorded the widest scope consistent with the spirit and scope of the appended claims.

What is claimed is:

1. A computer implemented method of identifying biomass including in an agricultural field, comprising:

receiving an input to initiate a continuous process for identifying biomass including plants in the agricultural field;

obtaining image data from one or more image sensors of an agricultural implement that is traversing rows of plants in the agricultural field, wherein each image sensor includes RGB filters and a plurality of polarization filters;

analyzing a number of independent channels from the image data of the RGB filters and the plurality of polarization filters to determine a plurality of parameters of the biomass including the rows of plants; and classifying the biomass including the rows of plants based on the analysis for 3D reconstruction of the rows of plants;

wherein the number of independent channels is thirteen including each one of four polarization filters being combined with each of red (R), green (G) and blue (B) and a separate near infrared (NIR);

wherein the plurality of parameters of the biomass includes at least one of a depth, a texture, and a shape of the plant.

2. The method of claim 1, wherein the number of independent channels is sixteen including each one of four polarization filters being combined with each one of red (R), green (G), blue (B) and near infrared (NIR).

3. The method of claim 1, wherein classifying the biomass including the rows of plants further comprises determining a type of crop.

4. The method of claim 1, wherein the plurality of parameters of the biomass further includes a growth stage of the plant.

5. The method of claim 1, wherein the agricultural implement comprises one of a sprayer and a planter.

6. The method of claim 1, wherein the one or more image sensors are arranged along a boom of the agricultural implement.

7. A system comprising:

a plurality of cameras disposed along an agricultural implement to capture a plurality of images of rows of plants as the agricultural implement traverses an agricultural field with each camera comprising one or more image sensors; and a processor that is configured to execute instructions to:

receive an input to initiate a continuous process for identifying biomass including plants in the agricultural field;

obtain image data from the one or more image sensors, wherein each image sensor includes RGB filters and a plurality of polarization filters;

analyze a number of independent channels from the image data to determine a plurality of parameters of the biomass including the rows of plants; and classify the biomass including the rows of plants based on the analysis for 3D reconstruction of the rows of plants;

wherein the number of independent channels is thirteen including each one of four polarization filters being combined with each of red (R), green (G) and blue (B) and a separate near infrared (NIR);

wherein the plurality of parameters of the biomass includes at least one of a depth, a texture, and a shape of the plant.

8. The system of claim 7, wherein the number of independent channels is sixteen including each one of four polarization filters being combined with each one of red (R), green (G), blue (B) and near infrared (NIR).

9. The system of claim 7, wherein classifying the biomass including the rows of plants further comprises determining a type of crop and, the plurality of parameters of the biomass includes at least one of a growth stage, a depth, a texture and a shape of the plant.

10. The system of claim 7, wherein the agricultural implement comprises one of a sprayer and a planter.

* * * * *